Dec. 8, 1925.
L. A. SAUER
VERMIN TRAP
Filed Oct. 29, 1921
1,564,976
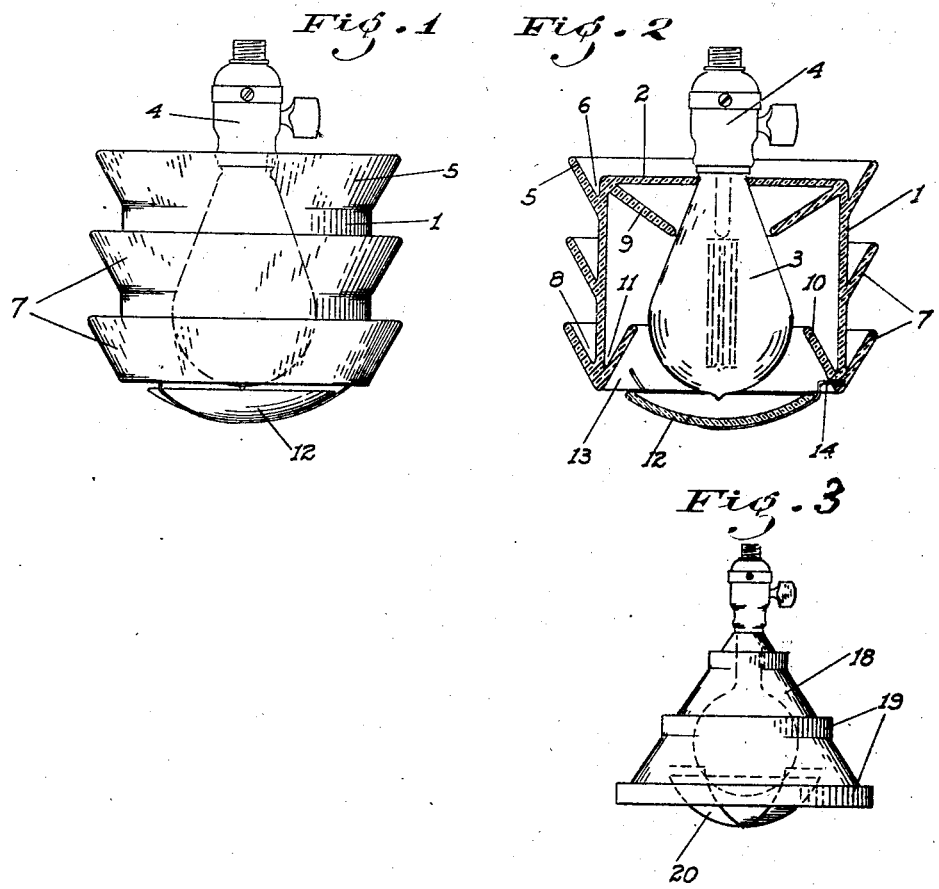
INVENTOR.
Louis A. Sauer
BY
ATTORNEY Patented Dec. 8, 1925.

1,564,976

UNITED STATES PATENT OFFICE.

LOUIS A. SAUER, OF WILLOWS, CALIFORNIA.

VERMIN TRAP.

Application filed October 29, 1921. Serial No. 511,474.

*To all whom it may concern:*

Be it known that I, LOUIS A. SAUER, a citizen of the United States, residing at Willows, in the county of Glenn, State of California, have invented certain new and useful Improvements in Vermin Traps; and I do declare the following to be a full, clear, and exact description of the same, reference being had to the accompanying drawings, and to the characters of reference marked thereon, which form a part of this application.

This invention relates to improvements in traps to catch vermin and insects of various kinds, and especially those which fly or jump and are very prevalent in warm weather, some being of such small dimensions that screen doors and windows are no bar to their entrance to a house, where, besides any actual damage they may cause, they are a constant source of annoyance to the occupants of the house, especially at night.

The principal object of my invention is to provide a trap for such pests which will use artificial light of any character to attract the insects thereto, and will further utilize the heat invariably generated by such a light to cripple or destroy the pests.

A further object of my invention is to provide a form of trap which may be made to be attached in connection with any ordinary electric light globe and at the same time form a shade or reflector therefor; or it may be applied in connection with an arc light such as is used for street and factory lighting, with illuminating gas burners, or any other artificial source of light.

Besides the adaptation of a trap utilizing the above named principle of operation for indoor use, it may also be made in a self-contained form for use in the field, or in the open generally, when the prevalence of certain kinds of vermin on or near the ground foreshadows damage to any crops which may be growing.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Fig. 1 is a side view of an approved form of the trap as applied to a standard electric light globe hung vertically.

Fig. 2 is a sectional elevation of the same.

Fig. 3 is a similar view of a form, showing the trap formed with a cone-shaped lamp shade or reflector.

Referring now more particularly to the characters of reference on the drawings, and particularly at this time to Figs. 1 and 2, the numeral 1 denotes a hollow casing, preferably cylindrical, which is open on the bottom but closed on top by a floor 2 having a central orifice through which the neck of an ordinary electric light globe 3 passes, the casing being thus enabled to be held in place between the lamp and its socket 4, the lower end of the casing projecting preferably to the plane of the tip of the lamp.

Formed integral with the casing adjacent the upper end is an upwardly and outwardly flaring flange 5, forming a continuous V-shaped pocket 6 with the side of the casing. Similarly disposed flanges 7 extend around the casing at spaced intervals below the flange 5, likewise forming pockets 8 with the casing.

Projecting downwardly and inwardly of the casing under the floor 2 is a guide flange or wall 9, centrally orificed of course for the passage of the globe 3 therethrough. Another upwardly and inwardly sloping flange 10 projects from the walls of the casing, having connection therewith at the bottom and forming a pocket 11 therewith, this pocket of course being thus located inside the casing.

The above described members are preferably a unit and integral structure, and preferably made of glass either plain or colored as may be desired, and so proportioned and designed that a serviceable lamp shade is provided apart from the trapping features. I do not wish however to limit myself to an integrally formed structure nor yet to the use of glass, as any material which is a good conductor of heat may be used, such as tin or other metal.

Also, it is to be understood that the number of flanges may be varied to suit different conditions and sizes of traps.

Positioned under the casing and globe is an inverted combined light and heat reflector and trapping bowl 12, which is positioned and of a size relative to the casing 1, to leave a continuous opening or entrance 13 therebetween. The bowl is preferably hinged to the casing in any suitable fashion, and provided with a catch member as at 14 engaging the casing but adapted to be disengaged therefrom at will, so that the bowl may be swung down and cleared out when necessary.

From the foregoing description, it will be evident that after the lamp has been burning for any length of time, atmosphere inside the casing will become extremely heated, since the air therein is confined and heat concentrated, and consequently the casing itself, and the flanges etc. thereof, likewise become very hot.

In operation, the trap serves to catch vermin in various ways. Attracted by the light, some of the vermin alight on the floor 2, where the smaller and weaker ones are at once shriveled and killed by the heat. The hardier ones, though cripples, may manage to crawl to the edge of the floor, only to drop into the pocket 6. Also, any insects flying against the sides of the casing will at once be stunned or crippled by the heat, and will drop into the heated pockets 8, where their destruction is completed.

Still others will fly into the interior of the casing through the entrance 13, where they will be shriveled and burned by the hot air, without necessarily coming in contact with any of the heated surfaces, and will drop either into the pocket 11 or bowl 12.

Those insects which survive contact with the air and attempting to fly upward, will strike against the guides 9, which will deflect them against the walls of the casing, by which time they will be about exhausted and crippled, and will drop into the pocket 11.

If desired, the floor 2 may be omitted, in which case the guide flanges 9 serve in place thereof. In this case some other means would of course have to be provided to support the casing.

It will be noted that the flange 10 overhangs the bowl 12, so that none of the falling vermin in the casing can pass below the same and drop onto the table or floor of the room.

The form of trap illustrated in Fig. 3 comprises a cone-shaped member 18, secured about the lamp and taking the place of the casing 1, about which member are placed any desired number of pocket-forming flanges 19. A reflector or bowl 20 similar to the bowl 12 is also used in connection with this style of trap.

While I have specified and shown electricity or gas as being the source of illumination and heat in the various forms of trap, this is merely because these two are the most commonly used at the present time.

I do not wish to confine myself solely to the use of these mediums however, since the trap may be made and used in connection with kerosene, gasoline or acetylene lamps, or with any other suitable source of light and heat.

As previously intimated, tin or some other opaque yet heat conducting material may be used for the casing. Such a construction will throw the light into the room as a solid beam. This has a tendency to attract vermin to the source of light from all parts of the room, when they will be destroyed as set forth.

Also while in Figs. 1 and 2 the casing is shown fixed between the socket and lamp, it may be attached to the socket itself or mounted a certain distance below the same.

Further, while I have shown certain definite forms of the casing, deflector, openings and trapping pocket members, the size, number and relative positions of these may be altered at will, according to the amount of heat available and the particular position which any certain form of the trap may be intended to assume.

Also, when desirable or found to be of advantage, deflectors, etc. may have mirrored or shaded surfaces, while the reflectors or bowls may have either smooth or corrugated surfaces, the latter having been proved advantageous in trapping the vermin.

The device therefore is capable of being made in an infinite variety of sizes and general form, so as to be useful over a wide range of conditions.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent, is:—

1. A trap including with a source of artificial light and heat, a casing surrounding said source, and formed of a translucent and heat-conducting material, said casing being closed at its upper end and open at the bottom, vertically disposed trapping pockets provided with the casing on the outside thereof, an inverted reflector and trapping bowl mounted at the lower end of the casing and of lesser periphery than the latter, and an upwardly inclined flange on the inside of the casing just above the bowl and overhanging the same.

2. A trap including with a source of artificial light and heat, a casing surrounding said source, and formed of a translucent and heat-conducting material, said casing being closed at its upper end and open at the bottom, trapping pockets provided with the casing, and an inverted reflector and trapping bowl mounted at the lower end of the casing but not closing the opening thereof.

3. A trap including a casing adapted to surround a source of light and heat, vertically disposed trapping pockets on the outside of the casing, and an upwardly inclined flange on the inside of the casing.

4. A trap including with a source of artificial light and heat, a casing surrounding said source and formed of a heat conducting material, said casing being closed at its upper end and open at the bottom, vertically disposed trapping pockets provided on the outside of the casing, and an inverted reflector and trapping bowl mounted at the lower end of the casing.

5. A trap including a casing adapted to surround a source of light and heat, and formed of heat conducting material trapping pockets provided with the casing on the outside thereof, an inverted trapping bowl mounted at the lower end of the casing, and an upwardly inclined flange on the inside of the casing.

6. A trap including a casing adapted to surround a source of light and heat, vertically disposed trapping pockets on the outside of the casing, the latter being open on the bottom and an inverted trapping bowl mounted at the lower end of the casing but not closing the entrance thereto.

7. A vermin trap comprising with the casing of a lamp, trapping pockets formed both on the outside and inside of said casing.

In testimony whereof I affix my signature.

LOUIS A. SAUER.